(12) United States Patent
Cai et al.

(10) Patent No.: US 11,619,975 B2
(45) Date of Patent: Apr. 4, 2023

(54) DISPLAY ASSEMBLY AND DISPLAY DEVICE

(71) Applicant: BOE TECHNOLOGY GROUP CO., LTD., Beijing (CN)

(72) Inventors: Peng Cai, Beijing (CN); Youwei Wang, Beijing (CN); Penghao Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/501,058

(22) Filed: Oct. 14, 2021

(65) Prior Publication Data

US 2022/0221907 A1 Jul. 14, 2022

(30) Foreign Application Priority Data

Jan. 11, 2021 (CN) .......................... 202120062468.9

(51) Int. Cl.
*G06F 1/16* (2006.01)
(52) U.S. Cl.
CPC .......... *G06F 1/1652* (2013.01); *G06F 1/1624* (2013.01)
(58) Field of Classification Search
CPC .............................. G06F 1/1652; G06F 1/1624
See application file for complete search history.

(56) References Cited

U.S. PATENT DOCUMENTS

| | | | | |
|---|---|---|---|---|
| 10,684,714 B2* | 6/2020 | Seo | ..................... | G06F 3/044 |
| 10,963,014 B1* | 3/2021 | Park | ..................... | G06F 1/1652 |
| 11,012,546 B1* | 5/2021 | Song | .................. | H04M 1/0237 |
| 11,016,532 B2* | 5/2021 | Yang | ..................... | G06F 1/1616 |
| 11,140,252 B1* | 10/2021 | Choi | ..................... | H04N 5/2253 |
| 11,194,363 B2* | 12/2021 | Kim | ..................... | G06F 1/1637 |
| 11,314,285 B2* | 4/2022 | Feng | ..................... | G06F 1/1652 |
| 2013/0058063 A1* | 3/2013 | O'Brien | ............... | G06F 1/1624 |
| | | | | 361/807 |
| 2018/0102072 A1* | 4/2018 | Lee | ..................... | G06F 1/1641 |
| 2019/0268455 A1* | 8/2019 | Baek | ..................... | G06F 1/1683 |
| 2020/0348727 A1* | 11/2020 | Lee | ..................... | G06F 1/1624 |
| 2022/0155823 A1* | 5/2022 | Shin | ..................... | G06F 1/1652 |

* cited by examiner

*Primary Examiner* — Rockshana D Chowdhury
(74) *Attorney, Agent, or Firm* — Houtteman Law LLC

(57) ABSTRACT

A display assembly and a display device are provided. The display assembly includes: a flexible display panel including first and second regions arranged side by side; at least one tension member each including a connection portion that is fixed in the first region, the connection portion has a first surface distal to the flexible display panel; at least one first support member in the first region; at least one second support member in the second region; wherein the at least one first support member, the at least one second support member and the connection portion are all on a non-display side of the flexible display panel; the at least one first support member has a first surface distal to the flexible display panel; and the first surface of the connection portion is closer to the flexible display panel than the first surface of the first support member.

20 Claims, 6 Drawing Sheets

DISPLAY ASSEMBLY AND DISPLAY DEVICE

CROSS REFERENCE TO RELATED APPLICATIONS

The present application claims the priority of the Chinese Patent Application No. 202120062468.9 filed on Jan. 11, 2021, the content of which is incorporated herein by reference in its entirety.

TECHNICAL FIELD

The present disclosure relates to the field of display technology, and in particular to a display assembly and a display device.

BACKGROUND

A flexible display device has the characteristics of being rollable, wide visual angle, being portable and the like, so the flexible display device has wide application prospect and good market potential in portable products and most display application fields. A flexible slidable-rollable display device may switch between different areas of its display region according to the requirements of a user, which is convenient for the user to carry, provides better use experience for the user, and thus, is an important direction for developing the flexible display device.

SUMMARY

The present disclosure provides a display assembly and a display device.

In a first aspect, the present disclosure provides a display assembly, including: a flexible display panel including a first region and a second region on a side of the first region; at least one tension member each including a connection portion, wherein the connection portion is fixed in the first region of the flexible display panel, and the connection portion has a first surface distal to the flexible display panel; at least one first support member in the first region of the flexible display panel; and at least one second support member in the second region of the flexible display panel; wherein the at least one first support member, the at least one second support member and the connection portion are all on a non-display side of the flexible display panel; the at least one first support member has a first surface distal to the flexible display panel; and a distance from the first surface of the at least one first support member to the flexible display panel is greater than a distance from the first surface of the connection portion to the flexible display panel.

In some embodiments, the at least one second support member has a second surface distal to the flexible display panel; the distance from the first surface of the at least one first support member to the flexible display panel is equal to a distance from the second surface of the at least one second support member to the flexible display panel.

In some embodiments, the first and second regions of the flexible display panel are arranged in a first direction; the first region includes, in a second direction, a region of the flexible display panel covered by the at least one tension member and an additional region other than the region, the first direction intersects the second direction; and the at least one first support member is in the additional region.

In some embodiments, the at least one first support member is on the first surface of the connection portion.

In some embodiments, the first and second regions of the flexible display panel are arranged in a first direction; the first region includes, in a second direction, a region of the flexible display panel covered by the at least one tension member and an additional region other than the region, the first direction intersects the second direction; at least one third support member is in the additional region, and has a third surface distal to the flexible display panel, and a distance from the third surface to the flexible display panel is equal to the distance from the first surface of the at least one first support member to the flexible display panel.

In some embodiments, the at least one third support member is in one-to-one correspondence with the at least one first support member, and each of the at least one third support member and a corresponding first support member have a one-piece structure.

In some embodiments, an orthogonal projection of the third and first support members having a one-piece structure on the flexible display panel extends through the first region in the second direction.

In some embodiments, each of the at least one first support member, the at least one second support member, and the at least one third support member is a bar-shaped structure; and wherein a dimension of each of the at least one first support member and the at least one third support member in the first direction is in a range of 0.3 mm to 0.7 mm.

In some embodiments, a material of each of the at least one first support member and the at least one second support member includes a metal.

In some embodiments, the at least one second support member and the connection portion of the at least one tension member are each adhered to the flexible display panel by an adhesive layer.

In some embodiments, a plurality of the second support members are in the second region and spaced apart from each other, and are sequentially arranged in a direction toward the first region.

In some embodiments, the flexible display panel includes: a flexible display substrate, a spacer layer and a support layer, and the spacer layer is between the flexible display substrate and the support layer, and the at least one first support member and the plurality of second support members are on a side of the support layer distal to the flexible display substrate.

In some embodiments, a material of the support layer includes a metal.

In some embodiments, the support layer has a hollow pattern therein.

In some embodiments, a material of each of the at least one first support member, the at least one second support member, and the at least one third support member includes a metal.

In a second aspect, the present disclosure further provides a display device, including: a fixed housing including a fixing portion; a slidable-rollable shaft; and the display assembly according to any of embodiments of the first aspect; wherein the flexible display panel is wound on the slidable-rollable shaft; and one end of the flexible display panel distal to the first region, and one end of the tension member distal to the connection portion are both connected to the fixing portion of the fixed housing; and the slidable-rollable shaft is configured to rotate about its axis, and to translate in a direction toward or away from the fixing portion.

In some embodiments, the display device further includes: a first guide shaft and a second guide shaft both parallel to the slidable-rollable shaft; the tension member sequentially surrounds the first guide shaft and the second guide shaft; and a distance between the first guide shaft and the fixing portion is kept constant; the second guide shaft is configured to rotate about its axis, and to translate in a direction toward or away from the fixing portion.

In some embodiments, a sum of a diameter of the first guide shaft and a diameter of the second guide shaft is smaller than a diameter of the slidable-rollable shaft.

In some embodiments, the diameter of the first guide shaft is smaller than the diameter of the second guide shaft, and the diameter of the second guide shaft is smaller than the diameter of the slidable-rollable shaft.

In some embodiments, the tension member includes a flexible organic material.

BRIEF DESCRIPTION OF DRAWINGS

The accompanying drawings, which are provided for further understanding of the present disclosure and constitute a part of this specification, are for explaining the present disclosure together with the following exemplary embodiments, but are not intended to limit the present disclosure. In the drawings.

DETAIL DESCRIPTION OF EMBODIMENTS

The detailed description of the embodiments of the present disclosure will be described in detail with reference to the accompanying drawings. It should be understood that the detailed description of the embodiments described here are only used to illustrate and explain the present disclosure, not to limit the present disclosure.

In order to make the objects, technical solutions and advantages of the present disclosure more apparent, the technical solutions of the embodiments of the present disclosure will be described clearly and integrally below reference to the accompanying drawings of the embodiments of the present disclosure. Obviously, the described embodiment is only part, not all, of the embodiments in the present invention. All other embodiments, which may be obtained by one of ordinary skill in the art without any creative effort based on the described embodiments in the present disclosure, belong to the protection scope of the present invention.

Terms used herein to describe embodiments of the present disclosure are not intended to limit and/or define the scope of the present disclosure. For example, unless defined otherwise, technical or scientific terms used herein should have the same meaning as commonly understood by one of ordinary skill in the art to which the present disclosure belongs. It should be understood that the terms of "first", "second", and the like used in the present disclosure are not intended to indicate any order, quantity, or importance, but rather are used for distinguishing one element from another. Unless the context clearly dictates otherwise, singular forms "a", "an", "the", or the like do not denote a limitation of quantity, but rather denote the presence of at least one element. The term of "comprising", "including", or the like, means that the element or item preceding the term contains the element or item listed after the term and the equivalent thereof, but does not exclude the presence of other elements or items. The term "connected", "coupled", or the like is not limited to physical or mechanical connections, but may include electrical connections, whether direct or indirect connections. The terms "upper", "lower", "left", "right", and the like are used merely for indicating relative positional relationships, and when the absolute position of an object being described is changed, the relative positional relationships may also be changed accordingly.

Figure 1:
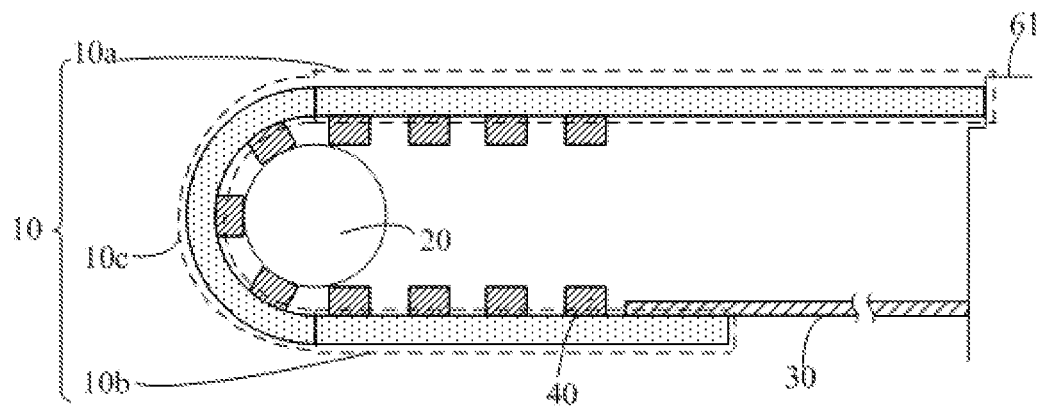
FIG. 1 is a schematic diagram of a flexible slidable-rollable display device in an initial state according to one embodiment.
Figure 2:
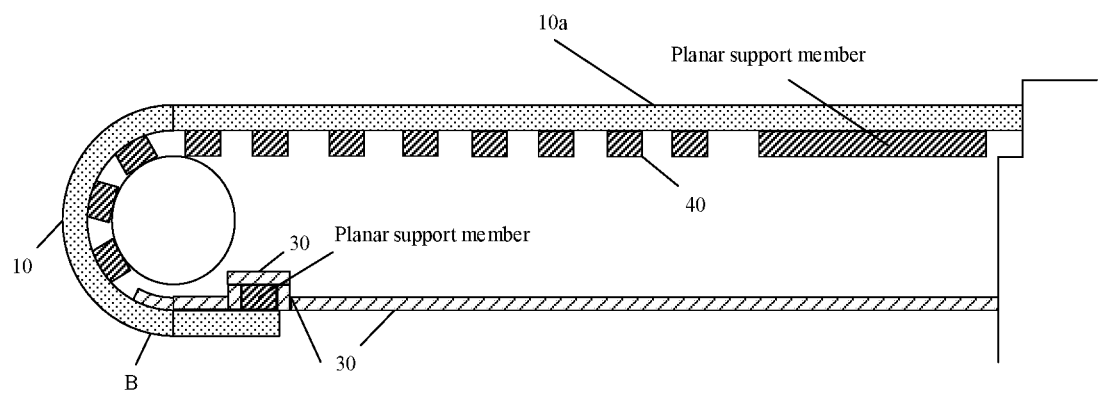
FIG. 2 is a schematic diagram of a flexible slidable-rollable display device in an unrolled state according to one embodiment.
Figure 3:
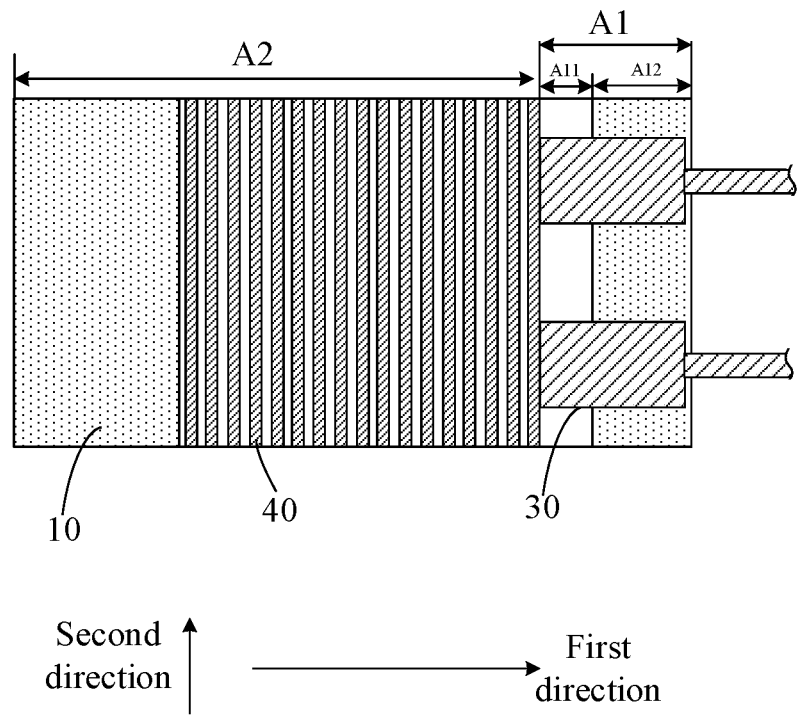
FIG. 3 is a schematic diagram of a structure of a flexible display panel and a tension member of the fully unrolled flexible slidable-rollable display device of FIG. 1.

FIG. 1 is a schematic diagram of a flexible slidable-rollable display device in an initial state according to one embodiment; FIG. 2 is a schematic diagram of a flexible slidable-rollable display device in an unrolled state according to one embodiment. As shown in FIGS. 1 and 2, the flexible slidable-rollable display device includes: a flexible display panel 10, a slidable-rollable shaft (or slidable-rollable roller) 20 and a tension member 30; one end of the tension member 30 is fixed to a non-display side of the flexible slidable-rollable display device, and the other end is connected to a fixing portion 61 of a fixed housing of the flexible slidable-rollable display device. A plurality of support bars 40 are provided on the non-display side of the flexible display panel 10. FIG. 3 is a schematic diagram of a structure of a flexible display panel and a tension member of the fully unrolled flexible slidable-rollable display device of FIG. 1. The slidable-rollable shaft 20 is not shown in FIG. 3. As shown in FIG. 3, the flexible display panel 10 is divided into a first region A1 and a second region A2 on a side of the first region A1; a portion of the tension member 30 is fixed in the first region A1 of the flexible display panel 10; support bars 40 are fixed in the second region A2. Further, the first region A1 includes a first sub-region A11 (e.g., a white region in FIG. 3) and a second sub-region A12 (e.g., a dotted region in FIG. 3). In the embodiment of the present disclosure, the support bars 40 are bar-shaped and extend along the second direction.

Also shown in FIG. 2 is a planar support member which is a one-piece structure and is disposed in the second sub-region A12 and in the second region A2 where the support bars 40 are not disposed. The planar support member extends along the second direction as shown in FIG. 3, i.e., a dimension (size) of the planar support the in the second direction is the same as that of the support bar 40 in the second direction and the same as that of the flexible display panel 10 in the second direction. A size of the planar support member in a third direction is the same as that of the support bar 40, the third direction is perpendicular to the first and second directions, i.e., the third direction is perpendicular to a direction of the plan view shown in FIG. 3, or the third direction is the vertical direction as shown in FIG. 2. That is, a thickness of the planar support member is the same as that of the support bar 40. As shown in FIG. 2, the tension member 30 is arranged around the planar support member, i.e. the tension member 30 extends in the first direction and surrounds three sides of the planar support member. In other embodiments of the present disclosure, the support bars 40 may be provided in the same manner in a region where the planar support member is provided, instead of the planar support member. The flexible slidable-rollable display device has a certain unrolled limit and the flexible display panel 10 of the flexible slidable-rollable display device includes a region that may be unrolled as well as a region that cannot be unrolled. However, during the unrolling of the flexible slidable-rollable display device, the support members disposed inside the flexible display panel 10 need to move around the slidable-rollable shaft 20. Thus, the support members need to be designed to have a certain width and a certain interval therebetween. Therefore, bar-shaped support members (support bars 40) are provided in the region that may be unrolled so that a portion of the flexible display panel 10 corresponding to the region is unrolled around the slidable-rollable shaft 20; in the region that cannot be unrolled, the support bars 40 may be provided, or the planar support member may be provided, to support the flexible display panel 10 of the flexible slidable-rollable display device. For process simplicity, the planar support member is typically provided in the region that cannot be unrolled, as shown in FIG. 2.

FIG. 3 schematically shows the structure of the completely unrolled flexible slidable-rollable display device, for ease of understanding.

It should be noted that the planar support member and its arrangement with the tension member 30 is only schematically illustrated in FIG. 2. In the other figures of the present disclosure, for the sake of simplicity, the planar support member and its arrangement with the tension member 30 are not shown. However, other embodiments of the present disclosure corresponding to other figures may also include a positional relationship between the planar support member and the tension member 30 shown in FIG. 2.

Referring to FIGS. 1 to 3, the flexible display panel 10 includes a first portion 10a and a second portion 10b opposite to each other, and a third portion 10c connected between the first portion 10a and the second portion 10b; the first portion 10a is connected to the fixing portion 61; the second portion 10b is connected to the tension member 30; and the third portion 10c is connected between the first portion 10a and the second portion 10b. The first portion 10a is a main display portion of the flexible display panel 10.

When the slidable-rollable shaft 20 translates away from the fixing portion 61 of the fixed housing and rotates around its axis, the flexible display panel 10 is gradually unrolled. As shown in FIGS. 1 and 2, a length of the second portion 10b gradually decreases; a length of the first portion 10a gradually increases; a length of the third portion 10c does not change, and the decreasing length of the second portion 10b is equal to the increasing length of the first portion 10a. Thereby, an area of the display region for the user to view gradually increases. In the flexible slidable-rollable display device shown in FIG. 1, the support member 40 has a thickness greater than that of the tension member 30. Therefore, when the slidable-rollable shaft 20 moves such that the first sub-region A11 moves to a position below the slidable-rollable shaft 20, stress concentration occurs at a position B where the first region A1 and the second region A2 of the flexible display panel 10 meet, thereby easily causing damage to the flexible display panel 10.

As shown in FIG. 1 to FIG. 3, the flexible display panel 10 may be in a bent state (as shown in FIG. 1 or FIG. 2) or a flat state (or called an unbent state, as shown in FIG. 3). The bent state of the flexible display panel 10 refers to a state in which the flexible display panel 10 is maintained when being applied to the flexible slidable-rollable display device. The flat state of the flexible display panel 10 is a state shown for better understanding of the structure of the flexible slidable-rollable display device, which is not a normal state of the flexible display panel 10.

As used herein, the "initial state" may also be referred to as the "undeployed (rolled) state". The flexible slidable-rollable display device is in the "initial state" or in the "unrolled state" with respect to the flexible display panel 10 being in the bent state. The "unrolled state" means a state in which the flexible display panel 10 of the flexible slidable-rollable display device has a large area to display a picture; and the "initial state" refers to a state in which the flexible display panel 10 of the flexible slidable-rollable display device is not displaying a picture or has a small area to display a picture.

As used herein, the flexible slidable-rollable display device includes a display side; further, the flexible slidable-rollable display device also includes the non-display side in addition to the display side. The display side refers to a side of the flexible slidable-rollable display device that may be used for display, as shown in FIGS. 1 and 2, i.e., a side (i.e., an outer side) of the first portion 10a of the flexible display panel 10 distal to the slidable-rollable shaft 20. The non-display side refers to a side of the flexible slidable-rollable display device in addition to the display side, including an inner side of the flexible display panel 10 and a side (i.e., an outer side) of the second and third portions 10b, 10c distal to the slidable-rollable shaft 20, as shown in FIGS. 1 and 2.

Figure 4:
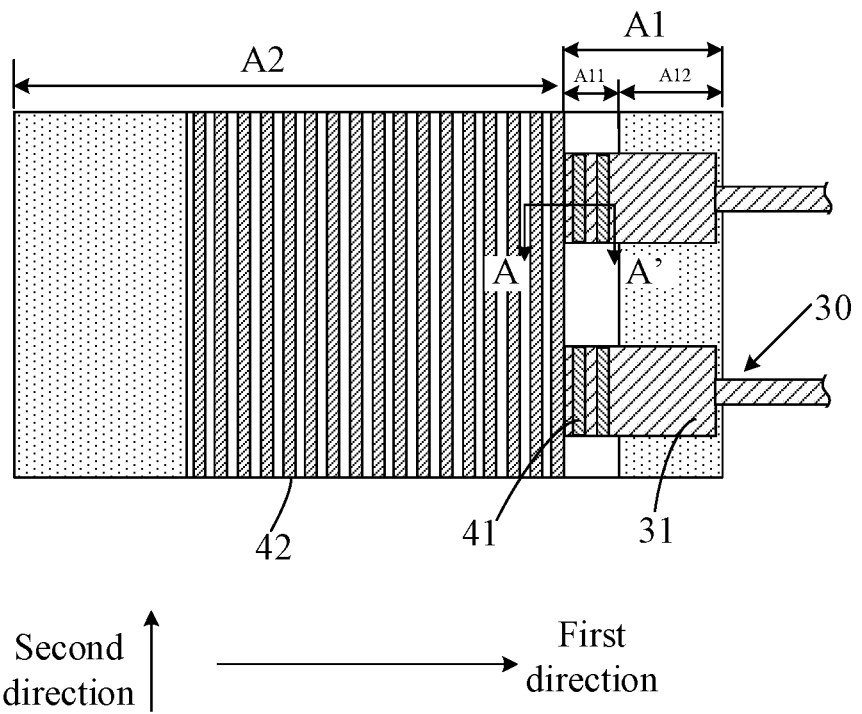
FIG. 4 is a plan view of a display assembly according to some embodiments of the present disclosure.
Figure 5:
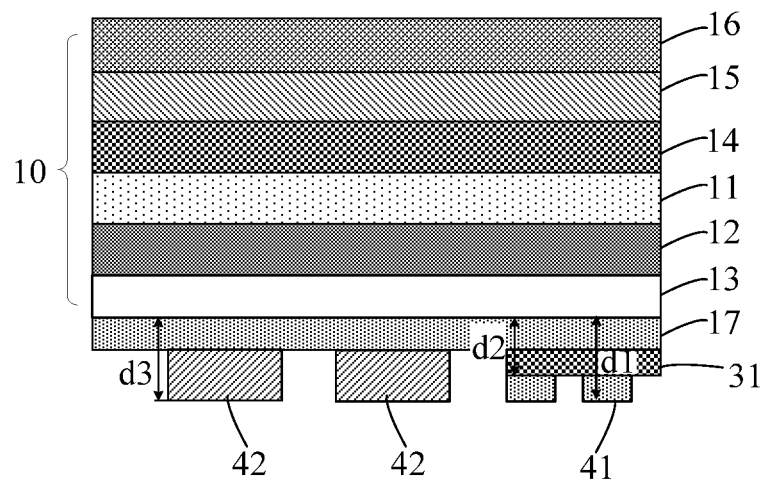
FIG. 5 is a cross-sectional view taken along a line A-A' of FIG. 4.

In a first aspect, the present disclosure provides a display assembly. FIG. 4 is a plan view of a display assembly according to some embodiments of the present disclosure; FIG. 5 is a cross-sectional view taken along a line A-A' of FIG. 4. As shown in FIGS. 4 and 5, the display assembly includes: a flexible display panel 10, at least one tension member 30, at least one first support member (support bar) 41 and at least one second support member (support bar) 42. As shown in FIGS. 4 and 5, the number of the tension members 30 is 2; the number of the first support members 41 is plural and the number of the second support members 42 is plural. The flexible display panel 10 includes a first region A1 and a second region A2 on a side of the first region A1. The first and second regions A1 and A2 are arranged in a first direction. For example, the first direction is a length direction of the flexible display panel 10. The flexible display panel 10 is for example an OLED display panel. The tension member 30 includes a connection portion 31, which is a portion of the tension member 30 that is fixed on the first region A1 of the flexible display panel 10; the connection portion 31 has a first surface and a second surface opposite to each other, wherein the first surface is a surface of the connection portion 31 distal to the flexible display panel 10. Note that, the surface of the connection portion 31 distal to the flexible display panel 10 means the surface of the connection portion 31 distal to the flexible display panel 10 when the flexible display panel 10 is in the flat state. The first region A1 includes a first sub-region A11 and a second sub-region A12. The first support members 41 are disposed on the tension members 30 and in the first sub-region A11 of the flexible display panel 10, and the second support members 42 are disposed in the second region A2 of the flexible display panel 10. In some embodiments of the present disclosure, a width of the first support member 41 (i.e., a dimension of the first support member 41 in the first direction) may be in the range of 0.3 mm to 0.7 mm. A width of each second support member 42 may be greater than that of each first support member 41, as shown in FIG. 5.

The first support members 41, the second support members 42 and the connection portions 31 are all located on the non-display side of the flexible display panel 10. The non-display side of the flexible display panel 10 includes the inner side of the flexible display panel 10 when the flexible display panel 10 is used in the display device and in the bent state. In some embodiments, the number of the first support members 41 and the number of the second support members 42 are plural, and the plurality of first support members 41 are spaced apart from each other; the plurality of second support members 42 are spaced apart from each other. The first support member 41 and the second support member 42 are bar-shaped structures, and extend along the second direction. In some embodiments of the present disclosure, a length of each second support member 42 (i.e., a dimension of each second support member 42 in the second direction) may be greater than that of each first support member 41, as shown in FIG. 4.

The first support member 41 has a first surface distal to the flexible display panel 10; the second support member 42 has a second surface distal to the flexible display panel 10. As shown in FIG. 5, a distance d1 from the first surface of the first support member 41 to the flexible display panel 10 is greater than a distance d2 from the first surface of the connection portion 31 to the flexible display panel 10; the distance d1 from the first surface of the first support member 41 to the flexible display panel 10 is substantially equal to a distance d3 from the second surface of the second support member 42 to the flexible display panel 10.

Figure 6:
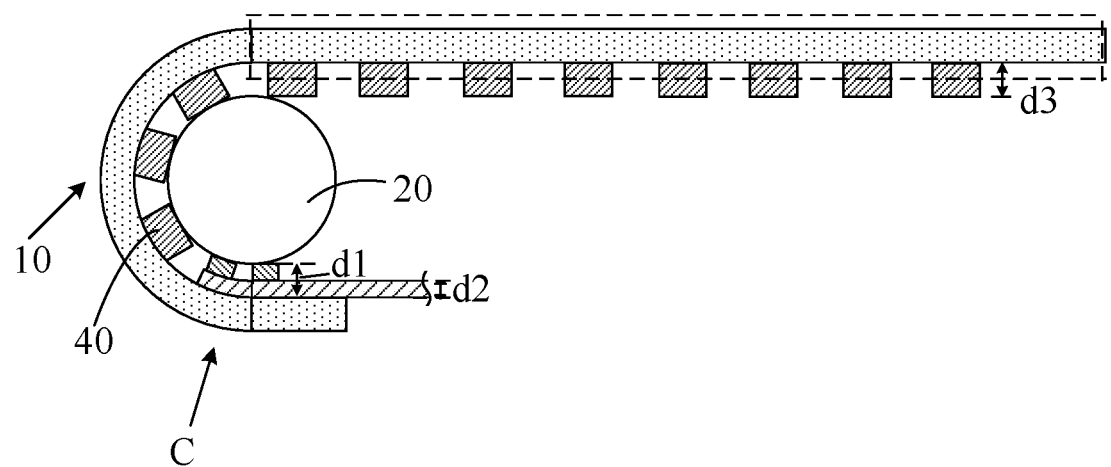
FIG. 6 is a schematic diagram of a display assembly when used in a flexible display device according to some embodiments of the present disclosure.

FIG. 6 is a schematic diagram of a display assembly when used in a flexible display device according to some embodiments of the present disclosure. As shown in FIGS. 4 to 6, the distance d1 from the first surface of the first support member 41 to the flexible display panel 10 is greater than the distance d2 from the first surface of the connection portion 31 to the flexible display panel 10, so that when the flexible display panel 10 is wound on the slidable-rollable shaft 20 and the slidable-rollable shaft 20 moves such that the first sub-region A11 moves to a position below the slidable-rollable shaft 20, the first surface of the first support member 41 is supported between the slidable-rollable shaft 20 and the connection portion 31. In this way, comparing with the position B in FIG. 2, in FIG. 6, it is more gradual at a position C where the first region A1 and the second region A2 of the flexible display panel 10 meet, so that the flexible display panel 10 is prevented from being damaged due to stress concentration at the position C, and the service life of the flexible display panel 10 is prolonged.

In some embodiments, the distance d1 from the first surface of the first support member 41 to the flexible display panel 10 is equal to the distance d3 from the second surface of the second support member 42 to the flexible display panel 10, so that the first support members 41 bear the same support force when the flexible display panel 10 is wound on the slidable-rollable shaft 20 and the slidable-rollable shaft 20 moves such that the first sub-region A11 moves to a position below the slidable-rollable shaft 20.

As shown in FIG. 4, the first region A1 includes a region covered by the tension member 30 on the flexible display panel 10 and a (additional) region except the region covered by the tension member 30 on the flexible display panel 10, which are arranged along the second direction. The second direction intersects the first direction. For example, the first direction is a length direction of the flexible display panel 10; the second direction is a width direction of the flexible display panel 10. In some embodiments, the first support members 41 are disposed on the first surface of the connection portion 31 (both shown in perspective in FIG. 4). That is, when the flexible display panel 10 is in the flat state, the first support members 41 are located on a side of the connection portions 31 distal to the flexible display panel 10.

Optionally, the first support members 41 may be adhered to the connection portions 31 by an adhesive material.

As shown in FIG. 5, the flexible display panel 10 includes a flexible display substrate 11, a spacer layer 12, and a support layer 13, which are sequentially stacked. The flexible display substrate 11 may include: a base plate, a light emitting device (e.g., an organic electroluminescent device) disposed on the base plate, and a pixel circuit providing a driving signal to the light emitting device. The flexible display panel 10 may further include a touch layer 14, a circular polarizer 15, and a protective layer 16, which are sequentially stacked on a side of the flexible display substrate 11 distal to the spacer layer 12 and the support layer 13. The touch layer 14 is used to detect the occurrence of touch; the circular polarizer 15 is arranged on a side of the touch layer 14 distal to the flexible display substrate 11; the protective layer 16 is arranged on a side of the circular polarizer 15 distal to the flexible display substrate 11.

The spacer layer 12 is arranged between the flexible display substrate 11 and the support layer 13; the first support members 41, the second support members 42 and the connection portions 31 of the tension members 30 are all disposed on a side of the support layer 13 distal to the flexible display substrate 11. The spacer layer 12 may include a foam pad and an adhesive material disposed on the foam pad; the spacer layer 12 is adhered to the flexible display substrate 11; the support layer 13 is adhered to the spacer layer 12. The support layer 13 is made of a metal material to prevent a stress concentration at a position of the flexible display substrate 11 at the first support bars 41, so as to protect the flexible display substrate 11. In addition, the support layer 13 may be provided with a hollow pattern therein, so that the flexible display panel 10 may be bent.

An adhesive layer 17 is provided on a side of the support layer 13 distal to the spacer layer 12. The connection portions 31 of the tension members 30 and the second support members 42 are both adhered to the adhesive layer 17.

Optionally, the first support members 41 and the second support members 42 may be made of a metal material to prevent the first support members 41 and the second support members 42 from being damaged after the display assembly is used for a long time, so as to prolong the service life of the display assembly.

Figure 7:
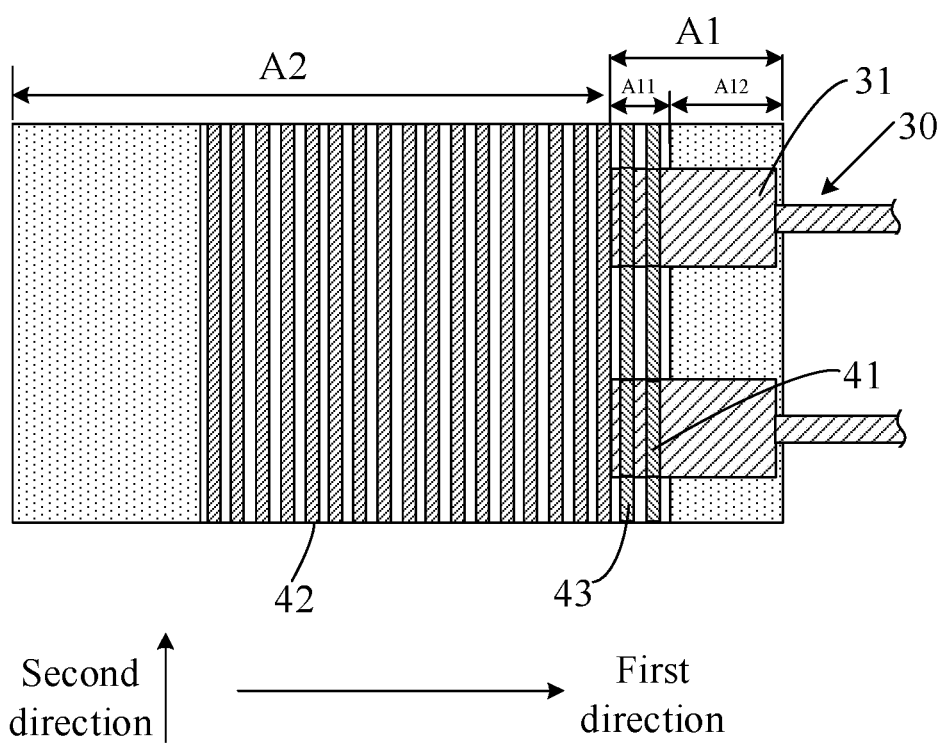
FIG. 7 is a plan view of a display assembly according to further embodiments of the present disclosure.

FIG. 7 is a plan view of a display assembly according to further embodiments of the present disclosure. As shown in FIG. 7, the connection portions 31 are provided in the first region; at least one third support member (support bar) 43 extending in the second direction is provided in the first sub-region A11 and in the region where the first support members 41 are not provided, and the third support member 43 may be adhered to the flexible display panel 10 by an adhesive material. A plurality of third support members 43 are spaced apart from each other. In some embodiments of the present disclosure, the third support member 43 has a bar-shaped structure. As shown in FIG. 7, the at least one third support member 43 is plural in number. In some embodiments of the present disclosure, a width of the third support member 43 (i.e., a dimension of the third support member 43 in the first direction) may be in a range of 0.3 mm to 0.7 mm. In some embodiments of the present disclosure, the third support member 43 may be made of a metal material.

The third support member 43 has a third surface distal to the flexible display panel 10, and a distance from the third surface of the third support member 43 to the flexible display panel 10 is equal to the distance from the first surface of the first support member 41 to the flexible display panel 10. Thus, when the flexible display panel 10 is in the flat state, the first surface of the first support member 41, the second surface of the second support member 42, and the third surface of the third support member 43 are flush with each other; when the flexible display panel 10 is wound on the slidable-rollable shaft 20 and the slidable-rollable shaft 20 moves such that the first sub-region A11 moves to a position below the slidable-rollable shaft 20, the first support members 41 and the third support members 43 jointly support the flexible display panel 10, so as to prevent the problem of stress concentration in the width direction of the flexible display panel 10.

Optionally, the at least one first support member 41 and the at least one third support member 43 are in one-to-one correspondence with each other, and each of the at least one third support member 43 and the corresponding first support have a one-piece structure. For example, as shown in FIG. 7, the display assembly includes two tension members 30, each tension member 30 having first support members 41 disposed thereon. When the flexible display panel 10 is in the flat state, the first support members 41 and the third support members 43 on the flexible display panel 10 are arranged in a plurality of columns along the second direction, two first support members 41 and three third support members 43 are arranged in each column, and the first support members 41 and the third support members 43 in the same column have a one-piece structure, as shown in FIG. 7.

It may be understood that, the connection portion 31 between the first support member 41 and the flexible display panel 10 has a certain thickness, and the connection portion 31 is not provided between the third support member 43 and the flexible display panel 10. Thus, the adhesive material between the third support member 43 and the flexible display panel 10 may be set to have a greater thickness, and the adhesive material between the first support member 41 and the flexible display panel 10 may be set to have a smaller thickness; or, a thickness of the first support member 41 is set to be smaller, and a thickness of the third support member 43 is set to be greater, such that the distance from the third surface of the third support member 43 to the flexible display panel 10 is equal to the distance from the first surface of the first support member 41 to the flexible display panel 10.

Alternatively, an orthogonal projection of the first and third support members 41 and 43 having a one-piece structure on the flexible display panel 10 extends through the first sub-region A11 in the second direction; and an orthogonal projection of the second support member 42 on the flexible display panel 10 extends through the second region A2 in the second direction, so that each position of the flexible display panel 10 in the width direction thereof is stably supported.

Figure 8:
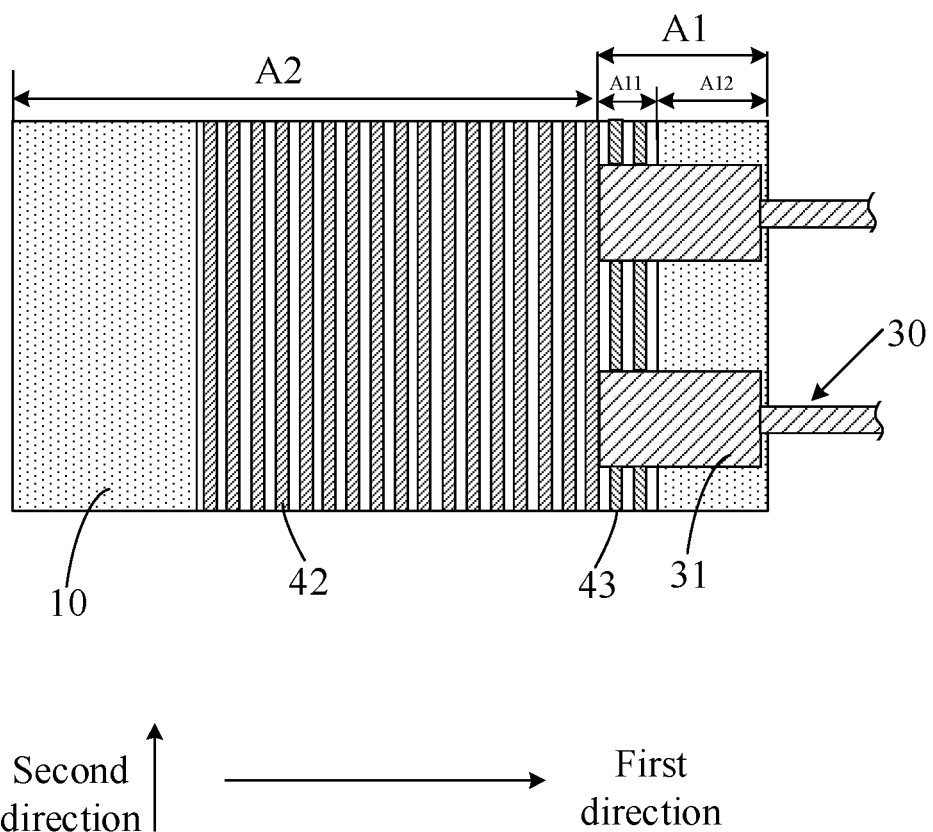
FIG. 8 is a plan view of a display assembly according to still further embodiments of the present disclosure.

FIG. 8 is a plan view of a display assembly according to still further embodiments of the present disclosure. In contrast to the embodiment shown in FIG. 7, only the third support members 43 are provided and the first support members 41 are not provided. As shown in FIG. 8, the connection portions 31 of the tension members are located in the first region, and the third support members 43 are located in the first sub-region and are not disposed on the connection portions 31. In this case, when the distance from the third surface of the third support member 43 to the flexible display panel 10 is greater than the distance from the first surface of the connection portion 31 to the flexible display panel 10, and the distance from the third surface of the third support member 43 to the flexible display panel 10 is substantially equal to the distance d3 from the second surface of the second support member 42 to the flexible display panel 10, the third support members 43 may also support the flexible display panel 10. Alternatively, the third support members 43 may be adhered to the support layer 13 for example by the adhesive layer 17 as shown in FIG. 5.

Figure 9:
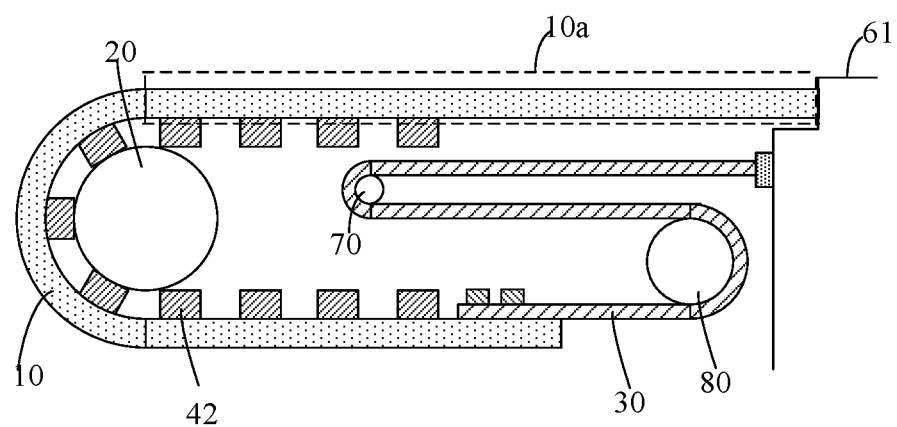
FIG. 9 is a schematic diagram of a display device in an initial state according to some embodiments of the present disclosure.
Figure 10:
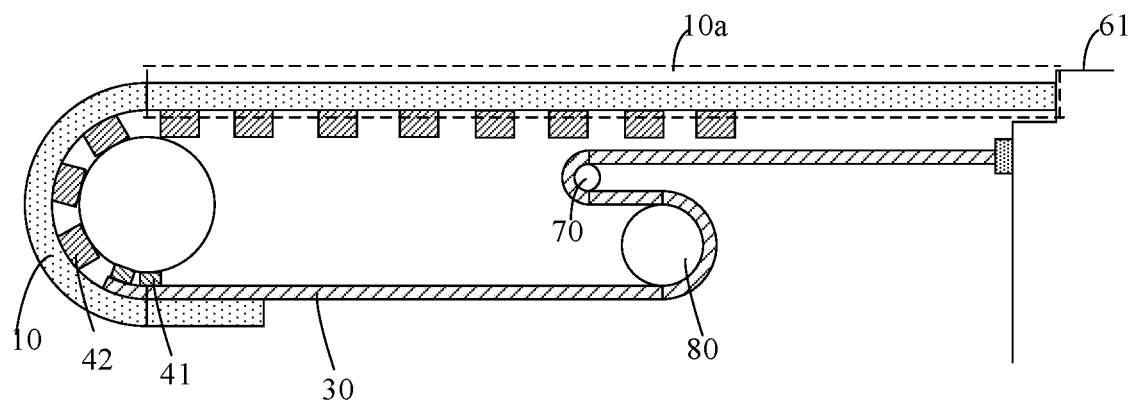
FIG. 10 is a schematic diagram of a display device in an unrolled state according to some embodiments of the present disclosure.

In a second aspect, the present disclosure also provides a display device. FIG. 9 is a schematic diagram of a display device in an initial state according to some embodiments of the present disclosure; FIG. 10 is a schematic diagram of a display device in an unrolled state according to some embodiments of the present disclosure. As shown in FIGS. 9 and 10, the display device includes: a fixed housing (shown as reference numeral "61" in FIGS. 9 and 10), the slidable-rollable shaft 20, and the display assembly in any of the embodiments described above. The fixed housing includes the fixing portion 61, the flexible display panel 10 is wound on the slidable-rollable shaft 20, and an end of the flexible display panel 10 distal to the first region A1 and an end of the tension member 30 distal to the connection portion 31 are connected to the fixing portion 61 of the fixed housing. The slidable-rollable shaft 20 is configured to rotate around its axis and translate in a direction toward or away from the fixing portion 61.

In FIGS. 9 and 10, a picture displayed by the first portion 10a of the flexible display panel 10 is a picture that may be seen by a user. An area of the first portion 10a is adjusted by adjusting the distance between the slidable-rollable shaft 20 and the fixing portion 61, so as to adjust the actual display area of the display device.

The tension member 30 may have a tension function on the flexible display panel 10 during the movement of the slidable-rollable shaft 20 toward or away from the fixing portion 61, thereby preventing the flexible display panel 10 from being wrinkled.

The present disclosure is not limited to a specific structure of the tension member 30 and a mounting form of the tension member 30 in the display device. In one specific example, the tension member 30 is made of an organic material with a better flexibility (e.g., polyimide). As shown in FIGS. 9 and 10, the display device further includes a first guide shaft (or first guide roller) 70 and a second guide shaft (or second guide roller) 80, both of which are disposed parallel to the slidable-rollable shaft 20; the tension member 30 sequentially surrounds the first guide shaft 70 and the second guide shaft 80, and a distance between the first guide shaft 70 and the fixing portion 61 is kept constant; the second guide shaft 80 is configured to rotate around its axis and to translate in a direction toward or away from the fixing portion 61. A diameter of the first guide shaft 70, a diameter of the second guide shaft 80, and a diameter of the slidable-rollable shaft 20 depend on a design space. Alternatively, as shown in FIGS. 9 and 10, the diameter of the first guide shaft 70 is smaller than the diameter of the second guide shaft 80, and the diameter of the second guide shaft 80 is smaller than the diameter of the slidable-rollable shaft 20. However, the present disclosure is not limited thereto. In other embodiments of the present disclosure, the diameter of the first guide shaft 70 may be greater than the diameter of the second guide shaft 80 and smaller than the diameter of the slidable-rollable shaft 20; or the diameter of the first guide shaft 70 may be equal to the diameter of the second guide shaft 80, and the diameter of the first guide shaft 70 and the diameter of the second guide shaft 80 are smaller than the diameter of the slidable-rollable shaft 20. In the embodiment of the present disclosure, the diameter of the first guide shaft 70, the diameter of the second guide shaft 80, and the diameter of the slidable-rollable shaft 20 may be specifically set as needed, as long as it is ensured that the sum of the diameter of the first guide shaft 70 and the diameter of the second guide shaft 80 is smaller than the diameter of the slidable-rollable shaft 20.

The display device may also include: a driving structure configured to drive rotation of the slidable-rollable shaft 20, the first guide shaft 70, the second guide shaft 80, and translation of the slidable-rollable shaft 20 and the second guide shaft 80. For example, when the driving structure drives the slidable-rollable shaft 20 and the second guide shaft 80 to move away from the fixing portion 61, and rotate about their respective axes, the display device may be switched from the initial state shown in FIG. 9 to the unrolled state shown in FIG. 10; when the driving structure drives the slidable-rollable shaft 20 and the second guide shaft 80 to move toward the fixing portion 61, and rotate about their respective axes, the display device may be switched from the unrolled state shown in FIG. 10 to the initial state shown in FIG. 9. In some embodiments of the present disclosure, the driving structure may be a motor.

It should be noted that the tension member 30 may also be installed in other manners. For example, the tension member 30 includes the connection portion 31 and an elastic portion (which is, for example, a spring or the like), one end of the elastic portion is connected to the connection portion 31, and the other end of the elastic portion is directly connected to the fixing portion 61, without providing the first guide shaft 70 and the second guide shaft 80.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display assembly, comprising:
    a flexible display panel comprising a first region and a second region on a side of the first region;
    at least one tension member each comprising a connection portion, wherein the connection portion is fixed in the first region of the flexible display panel, and the connection portion has a first surface distal to the flexible display panel;
    at least one first support member in the first region of the flexible display panel; and
    at least one second support member in the second region of the flexible display panel,
    wherein the at least one first support member, the at least one second support member and the connection portion are all on a non-display side of the flexible display panel; the at least one first support member has a first surface distal to the flexible display panel; and a distance from the first surface of the at least one first support member to the flexible display panel is greater than a distance from the first surface of the connection portion to the flexible display panel;
    wherein the first and second regions of the flexible display panel are arranged in a first direction; the first region comprises, in a second direction, a region of the flexible display panel covered by the at least one tension member and an additional region other than the region, and the first direction intersects the second direction; and
    the at least one first support member is in the additional region.

2. The display assembly of claim 1, wherein the at least one second support member has a second surface distal to the flexible display panel; the distance from the first surface of the at least one first support member to the flexible display panel is equal to a distance from the second surface of the at least one second support member to the flexible display panel.

3. The display assembly of claim 1, wherein the at least one first support member is on the first surface of the connection portion.

4. A display assembly, comprising:
    a flexible display panel comprising a first region and a second region on a side of the first region;
    at least one tension member each comprising a connection portion, wherein the connection portion is fixed in the first region of the flexible display panel, and the connection portion has a first surface distal to the flexible display panel;
    at least one first support member in the first region of the flexible display panel; and
    at least one second support member in the second region of the flexible display panel,
    wherein the at least one first support member, the at least one second support member and the connection portion are all on a non-display side of the flexible display panel; the at least one first support member has a first surface distal to the flexible display panel; and a distance from the first surface of the at least one first support member to the flexible display panel is greater than a distance from the first surface of the connection portion to the flexible display panel;
    wherein the at least one first support member is on the first surface of the connection portion;
    wherein the first and second regions of the flexible display panel are arranged in a first direction; the first region comprises, in a second direction, a region of the flexible display panel covered by the at least one tension member and an additional region other than the region, and the first direction intersects the second direction; and
    at least one third support member is in the additional region, and has a third surface distal to the flexible display panel, and a distance from the third surface to the flexible display panel is equal to the distance from the first surface of the at least one first support member to the flexible display panel.

5. The display assembly of claim 4, wherein the at least one third support member is in one-to-one correspondence with the at least one first support member, and each of the at least one third support member and a corresponding first support member have a one-piece structure.

6. The display assembly of claim 5, wherein an orthogonal projection of the third and first support members having a one-piece structure on the flexible display panel extends through the first region in the second direction.

7. The display assembly of claim 6, wherein each of the at least one first support member, the at least one second support member, and the at least one third support member is a bar-shaped structure; and
wherein a dimension of each of the at least one first support member and the at least one third support member in the first direction is in a range of 0.3 mm to 0.7 mm.

8. The display assembly of claim 1, wherein a material of each of the at least one first support member and the at least one second support member comprises a metal; or
wherein the at least one second support member and the connection portion of the at least one tension member are each adhered to the flexible display panel by an adhesive layer.

9. The display assembly of claim 1, wherein a plurality of the second support members are in the second region and spaced apart from each other, and are sequentially arranged in a direction toward the first region.

10. A display assembly, comprising:
a flexible display panel comprising a first region and a second region on a side of the first region;
at least one tension member each comprising a connection portion, wherein the connection portion is fixed in the first region of the flexible display panel, and the connection portion has a first surface distal to the flexible display panel;
at least one first support member in the first region of the flexible display panel; and
at least one second support member in the second region of the flexible display panel,
wherein the at least one first support member, the at least one second support member and the connection portion are all on a non-display side of the flexible display panel; the at least one first support member has a first surface distal to the flexible display panel; and a distance from the first surface of the at least one first support member to the flexible display panel is greater than a distance from the first surface of the connection portion to the flexible display panel;
wherein a plurality of the second support members are in the second region and spaced apart from each other, and are sequentially arranged in a direction toward the first region;
wherein the flexible display panel comprises: a flexible display substrate, a spacer layer and a support layer, and
the spacer layer is between the flexible display substrate and the support layer, and the at least one first support member and the plurality of second support members are on a side of the support layer distal to the flexible display substrate.

11. The display assembly of claim 10, wherein a material of the support layer comprises a metal.

12. The display assembly of claim 11, wherein the support layer has a hollow pattern therein.

13. The display assembly of claim 4, wherein a material of each of the at least one first support member, the at least one second support member, and the at least one third support member comprises a metal.

14. A display device, comprising:
a fixed housing comprising a fixing portion;
a slidable-rollable shaft; and
the display assembly of claim 1;
wherein the flexible display panel is wound on the slidable-rollable shaft; and one end of the flexible display panel distal to the first region, and one end of the tension member distal to the connection portion are both connected to the fixing portion of the fixed housing; and
the slidable-rollable shaft is configured to rotate about its axis, and to translate in a direction toward or away from the fixing portion.

15. The display device of claim 14, wherein the display device further comprises: a first guide shaft and a second guide shaft both parallel to the slidable-rollable shaft;
the tension member sequentially surrounds the first guide shaft and the second guide shaft; and a distance between the first guide shaft and the fixing portion is kept constant;
the second guide shaft is configured to rotate about its axis, and to translate in a direction toward or away from the fixing portion.

16. The display device of claim 15, wherein a sum of a diameter of the first guide shaft and a diameter of the second guide shaft is smaller than a diameter of the slidable-rollable shaft.

17. The display device of claim 16, wherein the diameter of the first guide shaft is smaller than the diameter of the second guide shaft, and the diameter of the second guide shaft is smaller than the diameter of the slidable-rollable shaft.

18. The display device of claim 16, wherein the tension member comprises a flexible organic material.

19. A display device, comprising:
a fixed housing comprising a fixing portion;
a slidable-rollable shaft; and
the display assembly of claim 4;
wherein the flexible display panel is wound on the slidable-rollable shaft; and one end of the flexible display panel distal to the first region, and one end of the tension member distal to the connection portion are both connected to the fixing portion of the fixed housing; and
the slidable-rollable shaft is configured to rotate about its axis, and to translate in a direction toward or away from the fixing portion.

20. A display device, comprising:
a fixed housing comprising a fixing portion;
a slidable-rollable shaft; and
the display assembly of claim 10;
wherein the flexible display panel is wound on the slidable-rollable shaft; and one end of the flexible display panel distal to the first region, and one end of the tension member distal to the connection portion are both connected to the fixing portion of the fixed housing; and
the slidable-rollable shaft is configured to rotate about its axis, and to translate in a direction toward or away from the fixing portion.

* * * * *